(12) United States Patent
Kleijn (10) Patent No.: US 9,716,901 B2
(45) Date of Patent: Jul. 25, 2017

(54) QUANTIZATION WITH DISTINCT WEIGHTING OF COHERENT AND INCOHERENT QUANTIZATION ERROR

(71) Applicant: GOOGLE INC., Mountain View, CA (US)

(72) Inventor: Willem Bastiaan Kleijn, Lower Hutt (NZ)

(73) Assignee: Google Inc., Mountain View, CA (US)

( * ) Notice: Subject to any disclaimer, the term of this patent is extended or adjusted under 35 U.S.C. 154(b) by 74 days.

(21) Appl. No.: 13/856,233

(22) Filed: Apr. 3, 2013

(65) Prior Publication Data

US 2015/0199970 A1 Jul. 16, 2015

Related U.S. Application Data

(60) Provisional application No. 61/650,826, filed on May 23, 2012.

(51) Int. Cl.
| | |
|---|---|
| *G10L 19/26* | (2013.01) |
| *H04N 19/85* | (2014.01) |
| *H04N 19/176* | (2014.01) |
| *H04N 19/117* | (2014.01) |
| *H04N 19/154* | (2014.01) |

(Continued)

(52) U.S. Cl.
CPC ............ *H04N 19/85* (2014.11); *G10L 19/26* (2013.01); *H04N 19/117* (2014.11); *H04N 19/154* (2014.11); *H04N 19/176* (2014.11); *H04N 19/124* (2014.11); *H04N 19/147* (2014.11)

(58) Field of Classification Search
None
See application file for complete search history.

(56) References Cited

U.S. PATENT DOCUMENTS 5,974,181 A * 10/1999 Prieto .................... H04N 19/63
375/E7.05
7,873,514 B2 * 1/2011 Ramprashad ......... G10L 19/038
704/200.1

(Continued)

OTHER PUBLICATIONS

"Quantization with Constrained Relative Entropy and Its Application to Audio Coding" Minyue Li et al AES Convention 2009.*

(Continued)

*Primary Examiner* — Pierre-Louis Desir
*Assistant Examiner* — Yi-Sheng Wang
(74) *Attorney, Agent, or Firm* — Brake Hughes Bellermann LLP (57) ABSTRACT

Methods and systems are provided for separating signal-correlated and signal-uncorrelated error components in quantization noise. Such separation leads to a generalization of the conventional rate-distortion optimization problem. For the commonly used assumption of a Gaussian process, a quantizer according to this principle is implemented in a straightforward manner using a dithered quantizer and appropriate pre-filters and post-filters. If the penalization of the signal-uncorrelated error component is increased over that of the signal-correlated error component, then the pre-filter emphasizes the signal spectrum more, reducing the differential entropy rate of the pre-filtered signal. Accordingly, the signal-uncorrelated noise is reduced for a given rate.

18 Claims, 4 Drawing Sheets

(51) Int. Cl.
*H04N 19/147* (2014.01)
*H04N 19/124* (2014.01)

(56) References Cited

U.S. PATENT DOCUMENTS

| | | | | |
|---|---|---|---|---|
| 8,682,652 | B2* | 3/2014 | Herre | G10L 19/022 704/200.1 |
| 2009/0254783 | A1* | 10/2009 | Hirschfeld | G10L 19/0017 714/701 |
| 2012/0177110 | A1* | 7/2012 | Kleijn | G10L 19/00 375/240.03 |

OTHER PUBLICATIONS

Edler et al "Perceptual Audio Coding Using a Time-Varying Linear Pre-and Post-Filter", IEEE AES 109th Convention 2000.*

Zamir et al "Achieving the Gaussian Rate-Distortion Function by Prediction" IEEE Tran. Information Theory, vol. 54 Issue 7 Jul. 2008.*

Schuchman "Dither Signal and Their Effect on Quantization Noise" IEEE Tran Comm, Dec. 1964.*

Malvar "Extended Lapped Transform: Properties, Application and Fast Algorithms", IEEE Tran Signal Processing, vol. 40 No. 11, Nov. 1992.*

"Perceptual Audio Conding Using a Time-Varying Linear Pre- and Post Filter" Edler, et al AES 109 th Convention 2000.*

"Dither Signals and Their Effect on Quantization Noise" Schuchman, IEEE Trans. Comm. Theory, Dec. 1964.*

"Achieving the Gaussian Rate-Distortion Function by Prediction" Zamir et al, IEEE Tran. Information Theory vol. 54 Issue 7 Jul. 2008.*

B. Edler and G. Schuller, "Audio coding using a psychoacoustic pre- and postfilter," in Proc. IEEE Int Conf. Acoust. Speech Signal Process., Istanbul, 2000, pp. 881-884.

F. Jabloun and B. Champagen, "Incorporating the human hearing properties in the signal subspace approach for speech enhancement," Speech and Audio Processing, IEEE Transactions on, vol. 11, No. 6, pp. 700-708, Nov. 2003.

N. Virag, "Single channel speech enhancement based on masking properties of the human auditory system," IEEE Trans. Speech and Audio Process., vol. 7, No. 2, pp. 126-137, 1999.

R. Zamir, Y. Kochman, and U. Erez, "Achieving the Gaussian rate distortion function by prediction," Information Theory, IEEE Transaction on, vol. 54, No. 7, pp. 3354-3364, Jul. 2008.

* cited by examiner

QUANTIZATION WITH DISTINCT WEIGHTING OF COHERENT AND INCOHERENT QUANTIZATION ERROR

The present application claims priority to U.S. Provisional Patent Application Ser. No. 61/650,826, filed May 23, 2012, the entire disclosure of which is hereby incorporated by reference.

TECHNICAL FIELD

The present disclosure generally relates to systems and methods for audio signal processing. More specifically, aspects of the present disclosure relate to optimizing the source-coding process by treating signal-correlated and signal-uncorrelated components separately.

BACKGROUND

It is desirable to make source coding more efficient in applications, where the final receiver is a human. In other words, improvements in source coding can be made to obtain a better trade-off between rate and perceived quality of the coded signal, where the signal can be audio, video, or an image. More particularly, it is desirable to move distortion from audible (and/or visible) and annoying to audible (and/or visible) but not annoying (e.g., the user may not notice the distortion if the user did not know the original).

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

Embodiments of the present disclosure relate to methods for distinguishing signal-correlated and signal-uncorrelated components in quantization noise. In at least one embodiment described herein, a pre-filter may be added before a quantization scheme and a post-filter added after the quantization scheme. Further details about the pre-filter, post-filter, and quantization scheme will be provided in the Detailed Description that follows.

One embodiment of the present disclosure relates to a method for quantization using a pre-filter and a post-filter, the method comprising assigning a first penalty amount to a signal-correlated quantization error component and a second penalty amount to a signal-uncorrelated quantization error component, the first penalty amount being different than the second penalty amount, wherein the quantization error is based on a distortion measure.

In another embodiment, the method for quantization further comprises constraining a distortion of the power spectrum of the full-constructed signal with respect to the original signal to be less than a specified value.

In yet another embodiment, the method for quantization further comprises using a predictive or non-predictive quantizer with the pre-filter and the post-filter.

In still another embodiment of the method for quantization, the pre-filter is configured to emphasize signal spectrum more strongly than the post-filter, resulting in a larger signal-correlated error estimate and a smaller signal-uncorrelated error estimate than rate-distortion optimal coding, for a given rate.

Another embodiment of the present disclosure relates to a pre-filter configured to emphasize structure of a signal prior to coding of the signal to reduce a rate required for coding the signal at a certain signal-to-noise ratio below the rate that is optimal according to rate-distortion theory.

In one or more other embodiments, the methods described herein may optionally include one or more of the following additional features: the pre-filter is approximated by a time-domain filter; the time-domain filter is an all-zero filter as the post-filter suppresses spectral regions; the post-filter is approximated by a time-domain filter; the time-domain filter is an all-zero filter as the post-filter suppresses spectral regions; the pre-filter is implemented with a Fourier or discrete-cosine transform; the post-filter is implemented with a Fourier or discrete-cosine transform; the pre-filter is an envelope filter; the post-filter is an envelope filter; the pre-filter is a pitch or fine-structure filter; the post-filter is a pitch or fine-structure filter; the distortion of the power spectrum is log spectral distortion; the distortion of the power spectrum is squared error of the power spectrum; the pre-filter and the post-filter are based on a weighted sum of a signal-correlated error estimate and a signal-uncorrelated error estimate; and/or the predictive or non-predictive quantizer is a predictive or non-predictive dithered quantizer.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

The headings provided herein are for convenience only and do not necessarily affect the scope or meaning of the claimed embodiments.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples and embodiments. One skilled in the relevant art will understand, however, that the various embodiments described herein may be practiced without many of these details. Likewise, one skilled in the relevant art will also understand that the various embodiments described herein can include many other obvious features not described in detail herein. Additionally, some well-known structures or functions may not be shown or described in detail below, so as to avoid unnecessarily obscuring the relevant description.

Embodiments described herein relate to methods and systems for distinguishing signal-correlated and signal-uncorrelated error components in quantization noise. In at least one embodiment, a pre-filter may be added before the quantization scheme and a post-filter added after the quantization scheme. As will be further described below, the pre-filter and post-filter may be optimized for a distortion measure that penalizes coherent (also referred to herein as "signal-correlated") and incoherent (also referred to herein as "signal-uncorrelated") quantization noise with different severities. This penalization may be done under the assumption that the quantizer produces additive noise, which is exact for a so-called dithered quantizer if the so-called Schuchman conditions are satisfied (it should be noted that this choice gives no restriction on performance). However, as will be described in greater detail below, the method also works for other situations as well.

In accordance with at least one embodiment, the method provides for adjustment of a settable parameter that determines the relative penalty of the coherent and incoherent quantization noise. The effects of the method are most noticeable at lower coding rates, where the listener or viewer can hear or see some distortion in the signal. For example, in the context of audio, the method may move the distortion from annoying (e.g., noisy) for a listener, to noticeable but not annoying (e.g., emphasized spectral shape) for the listener.

As described above, quantization noise can be separated into signal-correlated and signal-uncorrelated components. Such separation leads to a generalization of the conventional rate-distortion optimization problem. For the commonly used assumption of a Gaussian process, a quantizer according to this principle may be implemented in a straightforward manner using a dithered quantizer and appropriate pre-filters and post-filters. As will be described in greater detail herein, if the penalization of the signal-uncorrelated error component is increased over that of the signal-correlated error component, then the pre-filter emphasizes the signal spectrum more, reducing the differential entropy rate of the pre-filtered signal. Accordingly, the signal-uncorrelated noise is reduced for a given rate.

1. INTRODUCTION

Communication and broadcast devices generally introduce an error in the rendered signal. Simple every-day experiences show that these errors are not all equal. Signal-correlated errors, such as those corresponding to the spectral shaping of a telephone signal, for example, are perceived differently from signal-uncorrelated errors such as babble or wind noise. Although a perceptual weighting of the error is common, quantization approaches generally ignore the difference between signal-correlated and signal-uncorrelated errors.

The following description illustrates that the difference between these signal errors can be accounted for in a straightforward manner. As will be further described below, the relative importance of the two error types may be controlled by Lagrange multipliers. In at least one embodiment, the method provided includes the conventional solution as a particular case.

Rate-distortion (R(D)) theory indicates that optimal coding of a stationary ergodic discrete-time signal results, in general, in a reconstructed signal that has a spectral density different from that of the original signal. With decreasing rate, the reconstructed signal converges to the mean value of the original signal, which is reached when the rate is zero. The reduction in signal power of the reconstructed signal indicates that a component of the quantization error signal is correlated to the original signal.

In practical coding applications, perception often plays an important role. In the following description, audio is used an illustrative example. In audio coding, an adaptive weighting is used to assign a signal-dependent measure of perceptual importance to each time-frequency region. The time-frequency regions are generally obtained with lapped cosine transforms with fixed or variable block size and overlap. For applications requiring low delay, predictive coding may be used and, in such context, either perceptual pre- and post-filters or noise shaping can be used to implement the perceptual weighting.

It is useful to contrast the accounting for perception in quantization with that in signal enhancement. For example, in speech enhancement it is commonplace to decompose the error remaining after the enhancement operation into what may be referred to as "noise" and "distortion". Typically, the enhancement algorithm applies a linear operation to the noisy signal, the operation being adapted with each signal block. For the case that the noise is additive, this makes it possible to decompose the enhanced signal conceptually into a noise component and a signal component. The algorithms then trade an error variance of the signal component against a variance of the remaining noise component. As the term "distortion" has different meaning in rate-distortion theory and in enhancement, the following description will henceforth use the unambiguous terminology "signal-correlated error" and "signal-uncorrelated error".

Some audio coding approaches do treat the signal-correlated and signal-uncorrelated errors differently. However, while these errors may be treated differently by such approaches, no attempt is made to identify the components or to intentionally treat the components differently. For example, distribution-preserving quantization inherently assumes that the signal-uncorrelated error component is less important than a signal-correlated error component. On the other hand, sparse coding methods such as matching pursuit lead to a small signal-uncorrelated error. The coexistence of such different philosophies makes it natural to seek a means of adjusting the relative importance of the signal-correlated error component and the signal-uncorrelated error component. It is likely that their relative perceptual importance depends on the ability of the particular signal model used to describe the signal.

Accordingly, in describing the various embodiments of the present disclosure, it will be shown that the signal-correlated and signal-uncorrelated errors can be treated differently in a source coder. As will be further described herein, the result is an additional degree of freedom for optimizing the source-coding process. A straightforward implementation, valid under the Gaussian process assumption, is based on a pre- and post-filtering and dithered quantization (which results in additive quantization noise). As the relative penalization of the signal-uncorrelated component increases, the signal is pre-emphasized more strongly before quantization and the code signal has a more sparse character.

2. THEORY

The solution to the rate-distortion problem is the channel $f_{\hat{X}_i,X_i}$ that minimizes the mutual information rate between the uncoded process $X_i$ and the coded process $\hat{X}_i$, given an error measure for the error $X_i-\hat{X}_i$. This optimal channel can, for many cases, be represented as a backward channel where the source signal is the sum of the encoded signal and an independent noise process.

Figure 1:
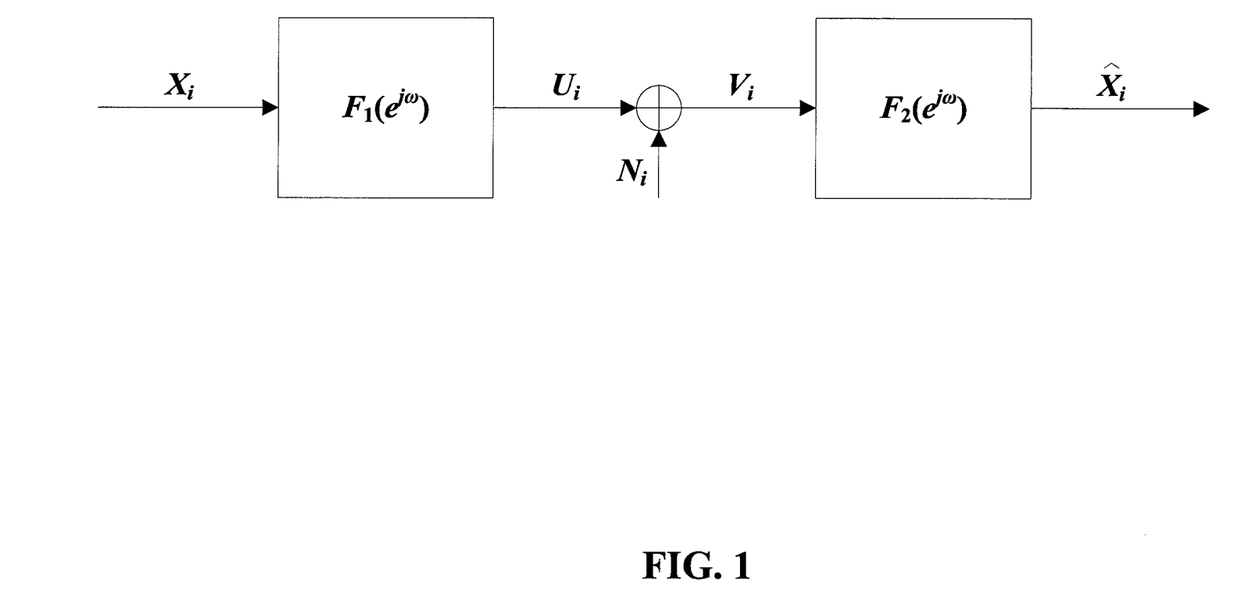
FIG. 1 is a block diagram illustrating an example structure for a forward channel according to one or more embodiments described herein.

The squared-error measure and the Gaussian case (it should be noted that the R(D) for a stationary Gaussian process is an upper bound for the rate-distortion function of any stationary process), the optimal channel may also be represented as a forward channel, as shown in FIG. 1, where the signal $X_i$ is filtered by a pre-filter to obtain $U_i$, noise is added to obtain $V_i$, and the result is filtered by a post-filter, which is the conjugate of the pre-filter, to obtain $\hat{X}_i$. It is straightforward to show, for example, that the rate can be written as the following:

$$R = \frac{1}{4\pi}\int_{-\pi}^{\pi} \log\left(1 + \frac{S_U(e^{j\omega})}{S_N(e^{j\omega})}\right)d\omega \qquad (1)$$

where $S_U(e^{j\omega})$ is the power-spectral density of $U_i$. The optimality of the forward channel implies that the response of its pre- and post-filters minimizes the rate (equation (1)) given a squared error distortion measure.

It is hypothesized herein that in audio and video scenarios the source-correlated components and the source-uncorrelated components are perceptually different. The forward channel representation facilitates the separation of the decoded process $\hat{X}_i$ into a component that is correlated with the source and a component that is not correlated with the source. The two components may then be considered separately in a generalized distortion measure.

The following first separates the error measure into two contributions: one from the correlated component and one from the uncorrelated component. The rate is minimized subject to separate constraints on the correlated and uncorrelated components. This results in a variational problem that has as solution a forward channel with different pre- and post-filters.

2.1. High-Rate Optimization of Pre-Filter and Post-Filter

The exemplary system illustrated in FIG. 1 is considered. To have an uncluttered notation, the notation $F_1$ is used for $F_1(e^{j\omega})$ where this is not ambiguous. It is assumed that the phase response of the concatenated pre- and post-filter $F_1F_2$ is zero, and also $S_{F_1}=|F_1|^2$ and $S_{F_2}=|F_2|^2$ is used for notational purposes. It is furthermore assumed in the present subsection of the description that $S_N$ and $S_X$ correspond to a high-rate scenario which is defined as the case where $S_{F_1}$ and $S_{F_2}$ are strictly greater than zero everywhere.

Consider the error process $X_i-\hat{X}_i$ with power spectral density $S_{X_i-\hat{X}_i}(e^{j\omega})$, which can be expressed as $$S_{X_i-\hat{X}_i}=(1-2\sqrt{S_{F_1}S_{F_2}}+S_{F_1}S_{F_2})S_X+S_{F_2}S_N \qquad (2)$$

The expression of equation (2) can be separated into a contribution from the source $X_i$ and a contribution from the noise component $N_i$. The total squared error $\eta$ can, therefore, be written as the sum of two components, $$\eta=\eta_X+\eta_N, \qquad (3)$$

where $\eta_X$ is the contribution from the source-correlated component, $$\eta_X = \frac{1}{2\pi}\int_{-\pi}^{\pi}\left(1-2\sqrt{S_{F_1}S_{F_2}}+S_{F_1}S_{F_2}\right)S_X d\omega, \qquad (4)$$

and where $\eta_N$ is the contribution from the component that is uncorrelated to the source, $$\eta_N = \frac{1}{2\pi}\int_{-\pi}^{\pi} S_{F_2}S_N d\omega. \qquad (5)$$

The rate (e.g., equation (1)) can be written in terms of $S_{F_1}$ and the power spectral density of the source, $S_X$:

$$R = \frac{1}{4\pi}\int_{-\pi}^{\pi}\log\left(1 + \frac{S_{F_1}S_X}{S_N}\right)d\omega. \qquad (6)$$

A Lagrangian problem may be formulated to minimize equation (6) subject to constraints on the error components of equations (4) and (5). The auxiliary equation of this Lagrangian problem is the following:

$$\Lambda(S_{F_1}, S_{F_2}) = R + \lambda_X \eta_X + \lambda_N \eta_N \qquad (7)$$

$$= \frac{1}{4\pi}\int_{-\pi}^{\pi}\left(\log\left(1 + \frac{S_{F_1}S_X}{S_N}\right)\right. \qquad (8)$$

$$+\lambda_X\left((1-2\sqrt{S_{F_1}S_{F_2}}+S_{F_1}S_{F_2})S_X\right. \qquad (9)$$

$$\left.+\lambda_N S_{F_2}S_N\right)d\omega. \qquad (10)$$

By differentiating the argument of the integral (e.g., equation (10)) to the functions $S_{F_1}$ and $S_{F_2}$, two Euler-Lagrange equations may be obtained. Differentiating $S_{F_2}$ and setting the result to zero brings about the following:

$$0 = \left(\left(-\sqrt{\frac{S_{F_1}}{S_{F_2}}}S_X + S_{F_1}S_X\right) + \frac{\lambda_N}{\lambda_X}S_N\right) \qquad (11)$$

$$S_X = \left(S_{F_1}S_X + \frac{\lambda_N}{\lambda_X}S_N\right)\sqrt{\frac{S_{F_2}}{S_{F_1}}} \qquad (12)$$

$$S_{F_2} = \frac{S_X^2}{\left(S_{F_1}S_X + \frac{\lambda_N}{\lambda_X}S_N\right)^2}S_{F_1}. \qquad (13)$$

The above expresses $S_{F_2}$ in terms of $S_{F_1}$. Differentiating equation (10) to $S_{F_1}$ and setting the result to zero gives the following:

$$0 = \frac{S_N}{S_N + S_{F_1}S_X} \frac{S_X}{S_N} + \lambda_X \left( -\sqrt{\frac{S_{F_2}}{S_{F_1}}} S_X + S_{F_2}S_X \right). \quad (14)$$

Inserting equation (13) into equation (14) leads to a quadratic equation in $S_{F_1}S_X$ as follows:

$$0 = \frac{S_N}{S_N + S_{F_1}S_X} \frac{S_X}{S_N} + \quad (15)$$

$$\lambda_X \left( -\frac{S_X}{\left(S_{F_1}S_X + \frac{\lambda_N}{\lambda_X}S_N\right)} + \frac{S_X^2}{\left(S_{F_1}S_X + \frac{\lambda_N}{\lambda_X}S_N\right)^2} S_{F_1}S_X \right)$$

$$0 = \frac{1}{S_N + S_{F_1}S_X} + \lambda_X \left( -\frac{S_X}{\left(S_{F_1}S_X + \frac{\lambda_N}{\lambda_X}S_N\right)} + \frac{S_X^2}{\left(S_{F_1}S_X + \frac{\lambda_N}{\lambda_X}S_N\right)^2} S_{F_1} \right) \quad (16)$$

$$0 = \frac{1}{S_N + S_{F_1}S_X} - \lambda_X \frac{\frac{\lambda_N}{\lambda_X}S_NS_X}{\left(S_{F_1}S_X + \frac{\lambda_N}{\lambda_X}S_N\right)^2} \quad (17)$$

$$0 = \frac{\left(S_{F_1}S_X + \frac{\lambda_N}{\lambda_X}S_N\right)^2}{S_{F_1}S_X + S_N} - \lambda_N S_N S_X \quad (18)$$

$$0 = \left(S_{F_1}S_X + \frac{\lambda_N}{\lambda_X}S_N\right)^2 - \lambda_N S_N S_X^2 S_{F_1} - \lambda_N S_N^2 S_X \quad (19)$$

$$0 = \left(\alpha + \frac{\lambda_N}{\lambda_X}S_N\right)^2 - \lambda_N S_N S_X \alpha - \lambda_N S_N^2 S_X \quad (20)$$

$$0 = \alpha^2 + 2\frac{\lambda_N}{\lambda_X}S_N\alpha + \left(\frac{\lambda_N}{\lambda_X}\right)^2 S_N^2 - \lambda_N S_N S_X \alpha - \lambda_N S_N^2 S_X \quad (21)$$

$$0 = \alpha^2 + \left(2\frac{\lambda_N}{\lambda_X}S_N - \lambda_N S_N S_X\right)\alpha + \left(\frac{\lambda_N}{\lambda_X}\right)^2 S_N^2 - \lambda_N S_N^2 S_X, \quad (22)$$

where $\alpha = S_{F_1}S_X$.

Following from the above, for the quadratic, $$b^2 = 4\left(\frac{\lambda_N}{\lambda_X}\right)^2 S_N^2 - 4\frac{\lambda_N^2}{\lambda_X}S_N^2 S_X + \lambda_N^2 S_N^2 S_X^2 \quad (23)$$

$$4ac = 4\left(\frac{\lambda_N}{\lambda_X}\right)^2 S_N^2 - 4\lambda_N S_N^2 S_X \quad (24)$$

$$b^2 - 4ac = \lambda_N^2 S_N^2 S_X^2 + 4\lambda_N S_N^2 S_X - 4\frac{\lambda_N^2}{\lambda_X}S_N^2 S_X \quad (25)$$

$$b^2 - 4ac = \lambda_N^2 S_N^2 S_X^2 \left(1 + \frac{4}{S_X}\left(\frac{1}{\lambda_N} - \frac{1}{\lambda_X}\right)\right). \quad (26)$$

The solution to the quadratic equation is the following:

$$S_{F_1}S_X = -\frac{\lambda_N}{\lambda_X}S_N + \frac{1}{2}\lambda_N S_N S_X \left(1 \pm \sqrt{1 + \frac{4}{S_X}\left(\frac{1}{\lambda_N} - \frac{1}{\lambda_X}\right)}\right) \quad (27)$$

$$S_{F_1} = -\frac{\lambda_N}{\lambda_X}\frac{S_N}{S_X} + \frac{1}{2}\lambda_N S_N \left(1 \pm \sqrt{1 + \frac{4}{S_X}\left(\frac{1}{\lambda_N} - \frac{1}{\lambda_X}\right)}\right). \quad (28)$$

Hitherto in the derivation, the noise spectrum $S_N$ is arbitrary as the pre- and post-filter may be chosen accordingly. This allows for a convenient choice for $S_N$. In one example, a natural choice is to select $S_N$ as constant at $$S_N = \frac{1}{\lambda_X}.$$

It is also convenient to define $$\beta = \frac{\lambda_N}{\lambda_X},$$

which expresses the relative importance of the correlated and uncorrelated signal error components. Using this definition, equation (29) simplifies to the following:

$$S_{F_1} = \frac{1}{2}\left(1 + \sqrt{1 + \frac{4S_N}{S_X}(1 - \beta)}\right) - \beta\frac{S_N}{S_X} \quad (29)$$

where, in accordance with at least some embodiments, only the larger of the two solutions is kept since it emphasizes spectral peaks and reduces spectral valleys. It should be noted that, as expected, equation (29) reduces to the R-D optimal solution $$S_{F_1} = 1 - \frac{S_N}{S_X}$$

for $\beta=1$. As noted above, the derivation assumes that $S_N$ and $S_X$ are such that $S_{F_1}>0$ and $S_{F_2}>0$.

Substituting equation (29) into equation (13) renders $S_{F_2}$ as follows:

$$S_{F_2} = \frac{S_X^2}{\left(S_{F_1}S_X + \frac{\lambda_N}{\lambda_X}S_N\right)^2} S_{F_1} \quad (30)$$

$$S_{F_2} = \frac{S_X^2}{S_X^2 \frac{1}{2}\left(1 + \sqrt{1 + \frac{4S_N}{S_X}(1 - \beta)}\right)^2} S_{F_1} \quad (31)$$

$$S_{F_2} = \frac{1}{\frac{1}{4}\left(1 + \sqrt{1 + \frac{4S_N}{S_X}(1 - \beta)}\right)^2} S_{F_1}. \quad (32)$$

As explained above, this result is obtained under the assumption that $S_N$ and $S_X$ are such that $S_{F_1}>0$ and $S_{F_2}>0$. If correlated and uncorrelated noise are equally weighted (e.g., in the R-D optimal case) then equation (32) shows that $S_{F_1}=S_{F_2}$ as expected. If the uncorrelated error component is penalized more strongly (e.g., $\beta>1$) then $S_{F_2}$ reduces the signal amplitude less than $S_{F_1}$.

2.2. High-Rate Small-Variation Analysis

The solutions presented above in equations (29) and (32) can easily be interpreted for small variations of the Lagrange multiplier ratio, $\beta \approx 1$. Then, since $$\sqrt{1+x} \approx 1 + \frac{1}{2}x,$$

we have the following:

$$S_{F_1} = \frac{1}{2}\left(1 + 1 + \frac{1}{2}\frac{4S_N}{S_X}(1-\beta)\right) - \beta\frac{S_N}{S_X} \quad (33)$$

$$S_{F_1} = 1 + \frac{S_N}{S_X}(1 - 2\beta). \quad (34)$$

Similarly, for $S_{F_2}$ the following is found:

$$S_{F_2} \approx \frac{4}{\left(1 + 1 + \frac{1}{2}\frac{4S_N}{S_X}(1-\beta)\right)^2}\left(1 + \frac{S_N}{S_X}(1 - 2\beta)\right) \quad (35)$$

$$S_{F_2} \approx \frac{1}{\left(1 + \frac{S_N}{S_X}(1-\beta)\right)^2}\left(1 + \frac{S_N}{S_X}(1 - 2\beta)\right) \quad (36)$$

$$S_{F_2} \approx \left(1 - \frac{S_N}{S_X}(1-\beta)\right)\left(1 + \frac{S_N}{S_X}(1 - 2\beta)\right) \quad (37)$$

$$S_{F_2} \approx 1 - \frac{S_N}{S_X}. \quad (38)$$

Therefore, to an approximation of $O((\beta-1)^2)$ the post-filter does not change with $\beta$, while increasing (decreasing) $\beta$ emphasizes (de-emphasizes) the pre-filter. This implies that as $\beta$ increases from 1, the rate decreases, the source-correlated error increases, and the source-uncorrelated error is constant. If $\beta$ is increased while keeping the rate constant, the source-uncorrelated error decreases and, therefore, the source-correlated error must increase.

2.3. Low-Rate Optimization of the Pre-Filter and Post-Filter

For low rates, the solution method presented above in section 2.1 results in filters with negative gains. Therefore, in one or more embodiments, the constraints $S_{F_1}(e^{j\omega}) \geq 0$ and $S_{F_2}(e^{j\omega}) \geq 0$ must be introduced. The auxiliary equation (10) becomes the Lagrangian:

$$\Lambda(S_{F_1}, S_{F_2}, \mu_1, \mu_2) = \frac{1}{4\pi}\int_{-\pi}^{\pi}\left(\log\left(1 + \frac{S_{F_1}(e^{j\omega})S_X(e^{j\omega})}{S_N(e^{j\omega})}\right) + \right. \quad (39)$$

$$\lambda_X\left(\left(-2\sqrt{S_{F_1}(e^{j\omega})S_{F_2}(e^{j\omega})} + S_{F_1}(e^{j\omega})\right)S_{F_2}(e^{j\omega})\right)$$

$$S_X(e^{j\omega})\right) + \lambda_N S_{F_2}(e^{j\omega})S_N(e^{j\omega})\right) -$$

$$\left.\mu_1(e^{j\omega})S_{F_1}(e^{j\omega}) - \mu_2(e^{j\omega})S_{F_2}(e^{j\omega})\right)d\omega$$

where the dependencies on $\omega$ are shown explicitly for clarity and where $\mu_1(e^{j\omega}) \geq 0$ and $\mu_2(e^{j\omega}) \geq 0$ are Karush-Kuhn-Tucker multipliers that for optimal $S_{F_1}$ and $S_{F_2}$ satisfy the complementary slackness conditions $$\mu_1(e^{j\omega})S_{F_1}(e^{j\omega}) = 0 \quad (40)$$

$$\mu_2(e^{j\omega})S_{F_2}(e^{j\omega}) = 0, \quad (41)$$

with $\mu_i(e^{j\omega}) = 0$ when $S_i(e^{j\omega}) = 0$ for $i \in \{1,2\}$. The solutions for $S_i(e^{j\omega}) > 0$ are unaffected as equation (10) is then identical to equation (39).

The general solutions for the filters $F_1$ and $F_2$ then satisfy the following:

$$S_{F_1} = \max\left(0, \frac{1}{2}\left(1 + \sqrt{1 + \frac{4S_N}{S_X}(1-\beta)}\right) - \beta\frac{S_N}{S_X}\right) \quad (42)$$

$$S_{F_2} = \max\left(0, \frac{1}{\left[\frac{1}{2}\left(1 + \sqrt{1 + \frac{4S_N}{S_X}(1-\beta)}\right)\right]^2}S_{F_1}\right) \quad (43)$$

where the notation $S_i = |F_i(e^{j\omega})|^2$ is used, and where $F_1 F_2$ is assumed to be zero phase.

2.4. Range of Feasibility for $\beta$

The Lagrange multiplier ratio $\beta$ determines the weight of the signal-correlated and signal-uncorrelated components. However, only values of $\beta$ that result in real equations (42) and (43) provide feasible solutions. Accordingly, equation (29) can be rewritten as follows:

$$S_{F_1} = \frac{1}{2}(1 + \gamma) - \beta\frac{S_N}{S_X}, \quad (44)$$

where $$\gamma = \sqrt{1 + \frac{4S_N}{S_X}(1-\beta)}.$$

For $\gamma$ to be real, the following condition exists:

$$\beta \leq 1 + \frac{S_X}{4S_N}, \quad (45)$$

As many power spectra have a range where $S_X$ is small or vanishes, and as equation (45) should be satisfied wherever $S_{F_1} > 0$ suggests that $\beta > 1$ is in general infeasible. This is not true as can be seen from considering the case where $\gamma = 0$: the condition for $S_{F_1} > 0$ imposes on $\beta$ the following condition:

$$\beta < \frac{1}{2}\frac{S_X}{S_N} \quad (46)$$

The bound of equation (45) is of no consequence if the bound of equation (46) is tighter. The switch between the two bounds happens at $$\frac{S_X}{S_N} = 4$$

and, as a result, the global bound is $$\beta \leq 2 \quad (47)$$

It was found during informal experiments that the formulated setup could handle desirable scenarios in audio coding. The restriction of equation (47) can be removed by explicitly incorporating the constraints that $S_{F_1}$ and $S_{F_2}$ are real in the optimization problem.

3. ILLUSTRATIVE RESULTS

The following section illustrates the effect of unequal penalization of the correlated and uncorrelated errors. For purposes of example, the quantizers are simulated using additive noise, which is accurate for dithered quantization under conditions that are easy to satisfy. The original signal used has a power spectral density that corresponds to the vocal-tract transfer function for the vowel "a" for a Nyquist frequency of 4 kHz. The overall rate of the shown systems, computed by equation (6), is held identical to 1 bit per sample.

Figure 2:
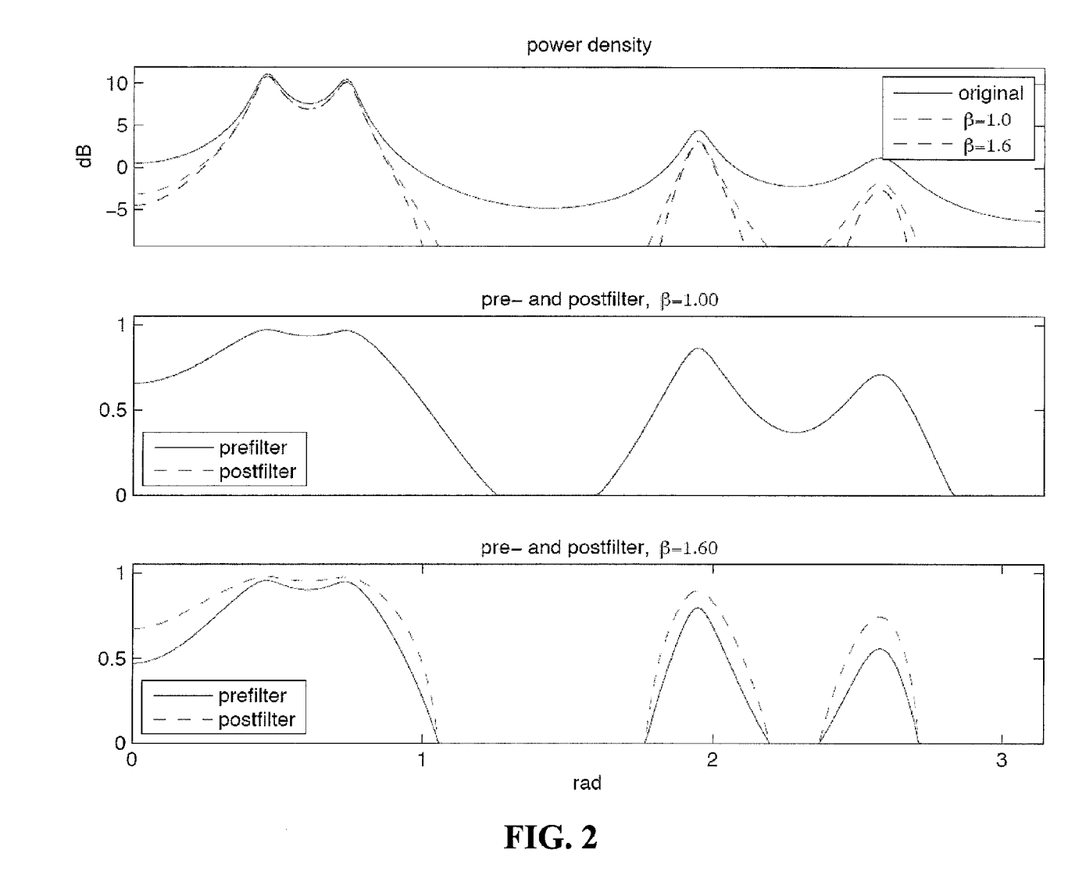
FIG. 2 is a graphical representation illustrating example power spectral densities of original and coded signals and pre- and post-filters according to one or more embodiments described herein.

FIG. 2 shows the power spectral densities of the original and the final reconstructions for $\beta=1.0$ (the R(D) optimal case) and for $\beta=1.6$ (stronger penalization of the uncorrelated error). It is seen in FIG. 2 that both filters attenuate the signal more in the spectral valleys. Note that for $\beta=1.6$, the pre-filtering is strengthened compared to the R(D) optimal case, which implies that the differential entropy rate of the signal is reduced. Thus, coding at the same SNR requires a lower rate for this signal and also results in a reconstruction that is more sparse in character.

Figure 3:
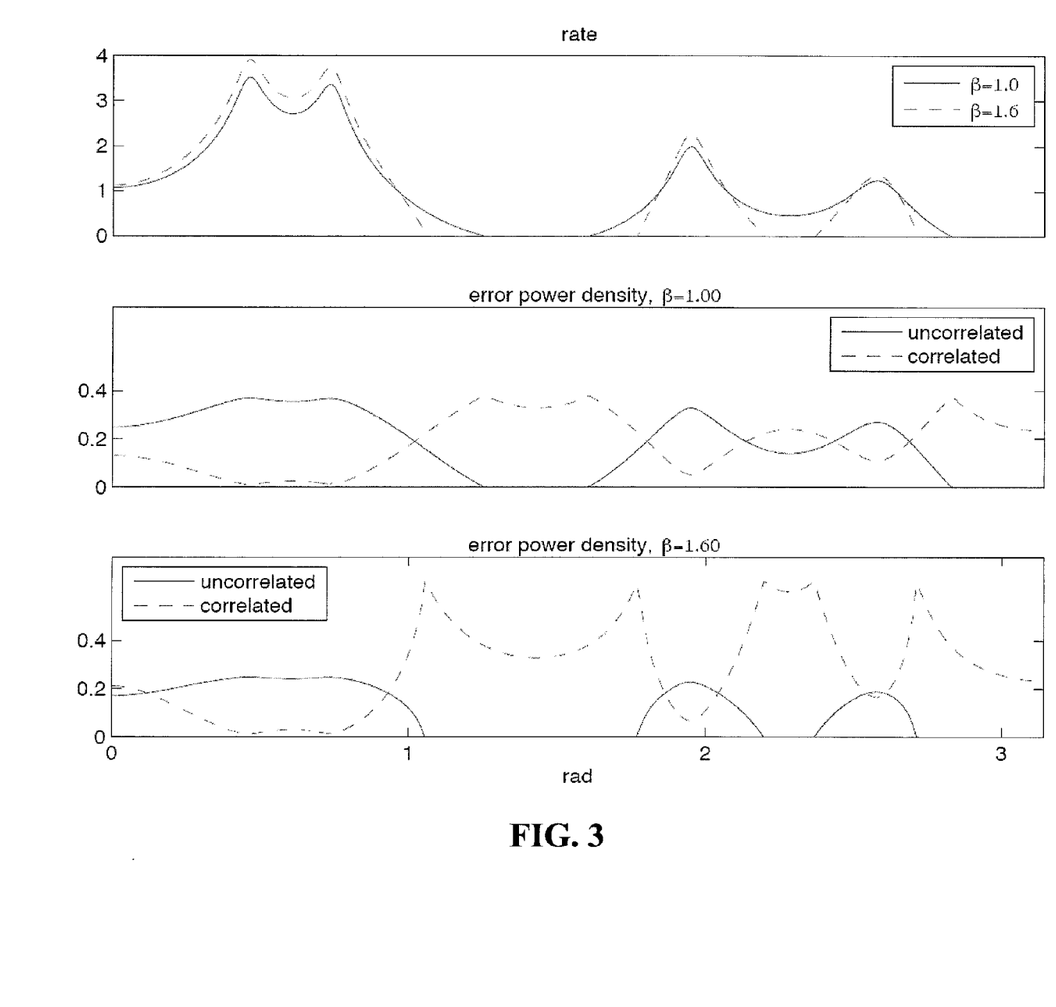
FIG. 3 is a graphical representation illustrating example rates and error power densities of original and coded signals and pre- and post-filters according to one or more embodiments described herein.

FIG. 3 illustrates the rate per unit frequency as a function of frequency in the top panel. It is clear in FIG. 3 that an increased $\beta$ increases the rate in high-energy spectral regions and reduces it elsewhere. The lower two panels shown in FIG. 3 illustrate that the signal-uncorrelated error is reduced and the signal-correlated error is increased when $\beta$ is increased.

Referring to FIG. 1, the system illustrated, which is equivalent to a practical dithered quantizer, may be implemented with speech used as input. The pre- and post-filtering may be implemented using a modulated lapped transform (e.g., 10 ms update, 20 ms windows) and may be performed only on the spectral envelope (e.g., and not the spectral fine structure). It can then be confirmed that by selecting values of $\beta$ on the interval [2,0], the perceived nature of the coded signal equivalent $\hat{X}_i$, changes significantly. In particular, the perceived nature goes from spectrally-distorted but noise-free, to spectrally-accurate but with added noise. As such, the optimal setting depends on the (equivalent) bit rate.

4. CONCLUSION

Evidence from speech enhancement and from coding indicates that the separate penalization of the signal-correlated and the signal-uncorrelated error provides a useful additional degree of freedom in the general source coding problem. In describing embodiments of the present disclosure, it has been shown that such separate penalization is easy to achieve if the assumption of Gaussianity is made.

In practical scenarios with relatively simple models, it is likely preferable to penalize the signal-uncorrelated component more strongly than the signal-correlated component. This implies that the strong spectral components are coded at a higher rate and the weaker spectral components are coded at a lower rate than for the rate-distortion optimal case, resulting in a signal with a sparse character. Additionally, the situation may be inverted for scenarios with very accurate signal models, where the signal-uncorrelated error becomes effectively indistinguishable from the signal itself.

It should be noted that it is natural to extend the method to include a constraint that limits distortion in the power-spectrum. At high rates the method may distort the signal to facilitate efficient coding. As the pre-filter attenuates the source signal, the signal distortion is associated with a decrease in signal energy, progressively more so with decreasing rate. However, the power-spectral distortion bound may prevent that the signal vanishes at low rate.

Figure 4:
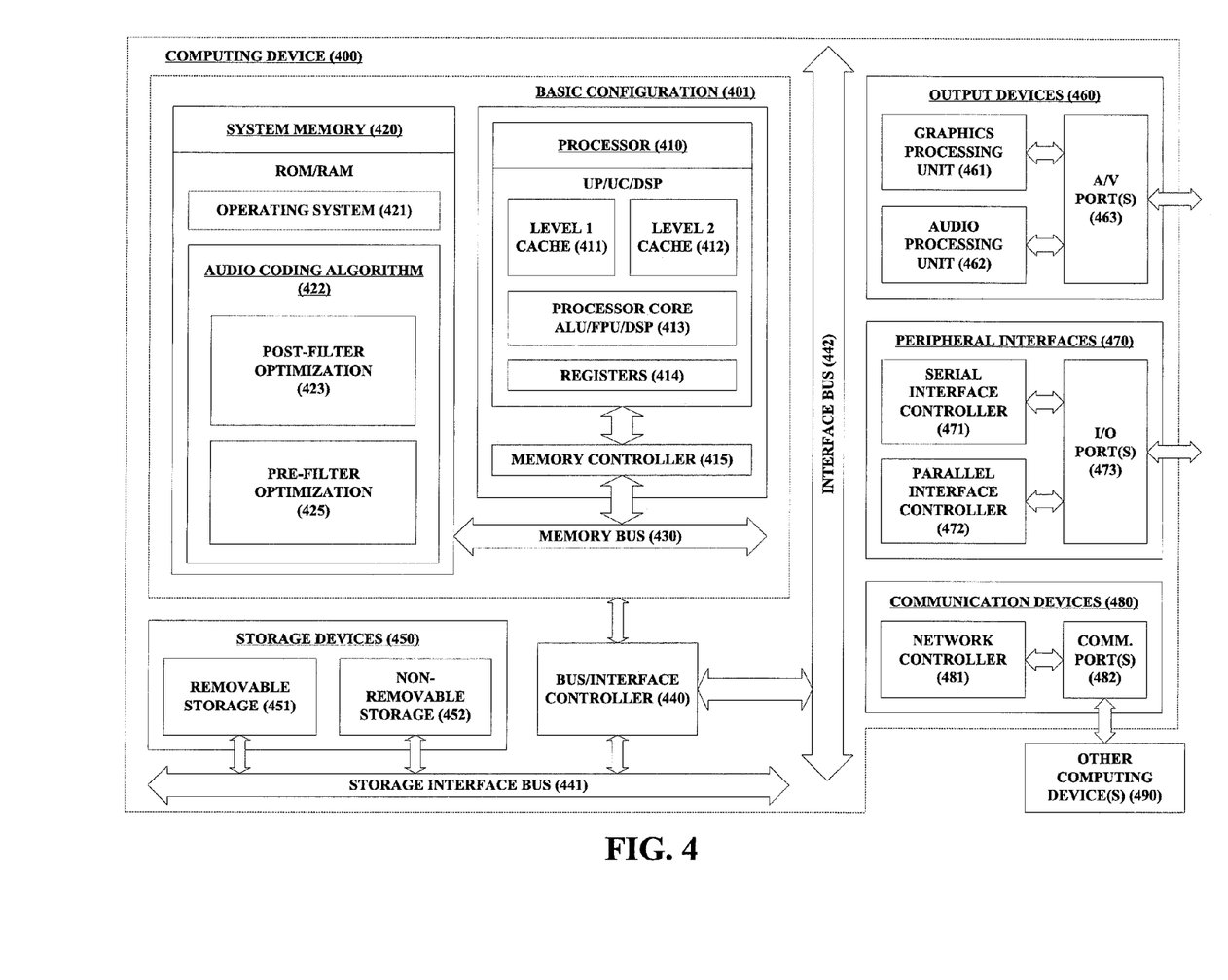
FIG. 4 is a block diagram illustrating an example computing device arranged for separate penalization of signal-correlated and signal-uncorrelated error according to one or more embodiments described herein.

FIG. 4 is a block diagram illustrating an example computing device 400 that is arranged for distinguishing (e.g., separating) signal-correlated and signal-uncorrelated error components in quantization noise, in accordance with one or more embodiments of the present disclosure. In a very basic configuration 401, computing device 400 typically includes one or more processors 410 and system memory 420. A memory bus 430 may be used for communicating between the processor 410 and the system memory 420.

Depending on the desired configuration, processor 410 can be of any type including but not limited to a microprocessor (µP), a microcontroller (µC), a digital signal processor (DSP), or any combination thereof. Processor 410 may include one or more levels of caching, such as a level one cache 411 and a level two cache 412, a processor core 413, and registers 414. The processor core 413 may include an arithmetic logic unit (ALU), a floating point unit (FPU), a digital signal processing core (DSP Core), or any combination thereof. A memory controller 415 can also be used with the processor 410, or in some embodiments the memory controller 415 can be an internal part of the processor 410.

Depending on the desired configuration, the system memory 420 can be of any type including but not limited to volatile memory (e.g., RAM), non-volatile memory (e.g., ROM, flash memory, etc.) or any combination thereof. System memory 420 may include an operating system 421, one or more audio coding algorithms 422, which include both encoder and decoder components. In at least some embodiments, audio coding algorithm 422 includes a post-filter optimization 423 and a pre-filter optimization 425. The audio coding algorithm 422 is configured to operate (e.g., execute, initiate, run, etc.) the resulting pre-filter at the encoder and the post-filter at the decoder to produce a perceptually-enhanced reconstructed audio filter.

It will be clear to those skilled in the art that the pre-filter is determined and used at the encoder, and the post-filter determined and used at the decoder. Furthermore, it should be clear to those skilled in the art that, in general, the pre-filter optimization 425 and the post-filter optimization 423 are performed in a coordinated manner such that they act together to obtain results of the type described above in connection with various embodiments of the disclosure.

Computing device 400 can have additional features and/or functionality, and additional interfaces to facilitate communications between the basic configuration 401 and any required devices and interfaces. For example, a bus/interface controller 440 can be used to facilitate communications between the basic configuration 401 and one or more data storage devices 450 via a storage interface bus 441. The data storage devices 450 can be removable storage devices 451, non-removable storage devices 452, or any combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives and the like. Example computer storage media can include volatile and nonvolatile, removable and non-removable media implemented in any method or technology for storage of information, such as computer readable instructions, data structures, program modules, and/or other data.

System memory 420, removable storage 451 and non-removable storage 452 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media can be part of computing device 400.

Computing device 400 can also include an interface bus 442 for facilitating communication from various interface devices (e.g., output interfaces, peripheral interfaces, communication interfaces, etc.) to the basic configuration 401 via the bus/interface controller 440. Example output devices 460 include a graphics processing unit 461 and an audio processing unit 462, either or both of which can be configured to communicate to various external devices such as a display or speakers via one or more A/V ports 463. Example peripheral interfaces 470 include a serial interface controller 471 or a parallel interface controller 472, which can be configured to communicate with external devices such as input devices (e.g., keyboard, mouse, pen, voice input device, touch input device, etc.) or other peripheral devices (e.g., printer, scanner, etc.) via one or more I/O ports 473.

An example communication device 480 includes a network controller 481, which can be arranged to facilitate communications with one or more other computing devices 490 over a network communication (not shown) via one or more communication ports 482. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 400 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost versus efficiency tradeoffs. There are various vehicles by which processes and/or systems and/or other technologies described herein can be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation. In one or more other scenarios, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those skilled within the art that each function and/or operation within such block diagrams, flowcharts, or examples can be implemented, individually and/or collectively, by a wide range of hardware, software, firmware, or virtually any combination thereof.

In one or more embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments described herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof. Those skilled in the art will further recognize that designing the circuitry and/or writing the code for the software and/or firmware would be well within the skill of one of skilled in the art in light of the present disclosure.

Additionally, those skilled in the art will appreciate that the mechanisms of the subject matter described herein are capable of being distributed as a program product in a variety of forms, and that an illustrative embodiment of the subject matter described herein applies regardless of the particular type of signal-bearing medium used to actually carry out the distribution. Examples of a signal-bearing medium include, but are not limited to, the following: a recordable-type medium such as a floppy disk, a hard disk drive, a Compact Disc (CD), a Digital Video Disk (DVD), a digital tape, a computer memory, etc.; and a transmission-type medium such as a digital and/or an analog communication medium (e.g., a fiber optic cable, a waveguide, a wired communications link, a wireless communication link, etc.).

Those skilled in the art will also recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A method for reducing quantization error of an audio signal using a pre-filter and a post-filter, the method comprising:
    obtaining, by a processor of a computing device configured to distinguish between signal-correlated and signal-uncorrelated components of quantization error in audio signals, a quantization error of an audio signal, the audio signal having a given rate;
    separating, by the processor, the quantization error into a signal-correlated component and a signal-uncorrelated component, wherein the quantization error is based on a distortion measure;
    assigning, by the processor, a first penalty amount to the signal-correlated component of the quantization error by using the pre-filter prior to quantization of the audio signal;
    assigning, by the processor, a second penalty amount to the signal-uncorrelated component of the quantization error by using the post-filter after quantization of the audio signal, the first penalty amount being different than the second penalty amount; and
    reducing the signal-uncorrelated component of the quantization error for the given rate by adjusting, by the processor, the second penalty assigned to the signal-uncorrelated component to an amount greater than the first penalty assigned to the signal-correlated component.

2. The method of claim 1, wherein the pre-filter is approximated by a time-domain filter.

3. The method of claim 2, wherein the time-domain filter is an all-zero filter as the post-filter suppresses spectral regions.

4. The method of claim 1, wherein the post-filter is approximated by a time-domain filter.

5. The method of claim 4, wherein the time-domain filter is an all-zero filter as the post-filter suppresses spectral regions.

6. The method of claim 1, wherein the pre-filter is implemented with a Fourier or discrete-cosine transform.

7. The method of claim 1, wherein the post-filter is implemented with a Fourier or discrete-cosine transform.

8. The method of claim 1, wherein the pre-filter is an envelope filter.

9. The method of claim 1, wherein the post-filter is an envelope filter.

10. The method of claim 1, further comprising:
    pre-filtering the signal using a modulated lapped transform.

11. The method of claim 1, further comprising:
    post-filtering the signal using a modulated lapped transform.

12. The method of claim 1, further comprising constraining a distortion of the power spectrum of the full-constructed signal with respect to the original signal to be less than a specified value.

13. The method of claim 12, wherein the distortion of the power spectrum is log spectral distortion.

14. The method of claim 12, wherein the distortion of the power spectrum is squared error of the power spectrum.

15. The method of claim 1, wherein the pre-filter and the post-filter are based on a weighted sum of a signal-correlated error estimate and a signal-uncorrelated error estimate.

16. The method of claim 15, further comprising using a predictive or non-predictive quantizer with the pre-filter and the post-filter.

17. The method of claim 16, wherein the predictive or non-predictive quantizer is a predictive or non-predictive dithered quantizer.

18. The method of claim 1, wherein the pre-filter is configured to emphasize signal spectrum more strongly than the post-filter, resulting in a larger signal-correlated error estimate and a smaller signal-uncorrelated error estimate than rate-distortion optimal coding, for a given rate.

* * * * *